US008996185B2

(12) United States Patent
Nikovski et al.

(10) Patent No.: US 8,996,185 B2
(45) Date of Patent: Mar. 31, 2015

(54) METHOD FOR SCHEDULING POWER GENERATORS BASED ON OPTIMAL CONFIGURATIONS AND APPROXIMATE DYNAMIC PROGRAMMING

(75) Inventors: Daniel N. Nikovski, Brookline, MA (US); Weihong Zhang, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 394 days.

(21) Appl. No.: 13/153,239

(22) Filed: Jun. 3, 2011

(65) Prior Publication Data

US 2012/0310608 A1 Dec. 6, 2012

(51) Int. Cl.
*G06F 17/11* (2006.01)
*G06G 7/63* (2006.01)
*G05B 19/00* (2006.01)

(52) U.S. Cl.
CPC ..................................... *G05B 19/00* (2013.01)
USPC .............................. 700/291; 700/28; 700/297

(58) Field of Classification Search
CPC ..................................................... G06G 7/635
USPC ........................................................ 700/291
See application file for complete search history.

(56) References Cited

PUBLICATIONS

Ross, et al., "Dynamic Economic Dispatch of Generation" IEEE Transactions on Apparatus and Systems, vol. PAS-99, No. 6, Nov./Dec. 1980 pp. 2060-2068.*
Van den Bosch, et al., "A Solution of the Unit Commitment Problem Via Decomposition and Dynamic Programming" IEEE Transactions on Power Apparatus and Systems, vol. PAS-104, No. 7, Jul. 1985 pp. 1684-1690.*
Lee et al., "Approximate dynamic programming based approach to process control and scheduling"Computers and Chemical Engineering, vol. 30, 2006, pp. 1603-1618.*
C.K. Pang et al., "Optimal Short-Term Thermal Unit Commitment," IEEE Transactions on Power Apparatus and Systems, vol. PAS-95, No. 4, Jul./Aug. 1976.
Samer Takriti et al., "A Stochastic Model for the Unit Commitment Problem," IEEE Transactions on Power Systems, vol. 11, No. 3, Aug. 1996.

* cited by examiner

*Primary Examiner* — Mohammad Ali
*Assistant Examiner* — Emilio J Saavedra
(74) *Attorney, Agent, or Firm* — Dirk Brinkman; Gene Vinokur

(57) ABSTRACT

A unit commitment problem is solved for a set of generators with a set of configurations having a set of $2^{N \cdot T}$ schedules, wherein N is a number of generators i and T is a number of decision time steps. A reduced set of configurations is determined, and then a functional metric to measure a similarity of all possible pairs of the configurations is defined. Dynamic programming is applied to the reduced set of configurations using the similarity metric to determine an optimal configuration.

11 Claims, 2 Drawing Sheets

100

METHOD FOR SCHEDULING POWER GENERATORS BASED ON OPTIMAL CONFIGURATIONS AND APPROXIMATE DYNAMIC PROGRAMMING

FIELD OF THE INVENTION

This invention relates generally to generating electrical power by generators, and more particularly to unit commitment, which determines optimal configurations of generators to use and amounts of energy to be generated by each generator.

BACKGROUND OF THE INVENTION

The problem of unit commitment (UC) involves determining configurations of generators to use for power generation so as to meet a target power demand. As used herein, a configuration includes Boolean variables that indicate whether generators should be OFF or ON for a particular time step. Generators typically include nuclear, thermal, and renewable power sources. Generators are subject to constraints such as stable operating level, rate of ramping up or down, and the amount of time the generator is ON or OFF, which makes the commitment (UC) problem a difficult combinatorial optimization task, which arises when the operation of N individual generators is configured over T time steps, such that the total cost of producing electrical energy that meets the target power demand is minimized, while simultaneously observing the operational constraints of individual generators.

Conventionally, the unit commitment problem is typically formulated as a deterministic optimization problem where the outputs of the generators are assumed to be fully dispatchable, e.g., fossil-burned, nuclear, and the future power demand is assumed to be completely known or predictable. Various combinatorial optimization methods are known for solving deterministic UC problems, including methods based on dynamic programming, Lagrange relaxation, and mixed integer programming.

However, those assumptions are hardly true. Future power demand can rarely be predicted with errors less than 2% on prediction horizons of 24 hours or longer, so demand is in fact a random variable with at least that much standard deviation.

Moreover, the generation outputs of renewable undispatchable power sources, such as wind and solar, are highly volatile. For instance, the electricity generated by a wind turbine varies strongly with the wind speed, in combination with many factors such as its rated maximum power, cut-in and cut-out speed, generator efficiency, and air density.

Given these factors, it is more realistic to assume that the generated output is a random variable instead of a fixed value. Several different methods deal with uncertainties in the power demand and outputs of the undispatchable generators. One method plans for a higher than expected demand, in hope that the safety margin in power output would be able to cover possible deviations from target demand. The safety margin can be determined from the statistical properties of the demand, if available. However, that results in operating more and/or larger generators than are necessary to meet the target demand. That method essentially solves a non-deterministic problem via a deterministic approach in a conservative manner in hope that the overcommitted capacities can accommodate most, if not all, possible demand and generation output realizations.

Alternatively, another method handles uncertainties in demand directly and solves the corresponding non-deterministic decision problems via stochastic optimization methods, see Takriti et al., "A stochastic model of the unit commitment problem," IEEE Transactions on Power Systems, 11(3), 1497-1508, 1996. By modeling and planning for all possible contingencies, a stochastic scheduler correctly handles future variations of supply and demand, and provides a safety margin implicitly. However, the model for representing stochasticity is limited to only a few scenarios.

Another method organizes the scenarios through an efficient probabilistic representation in the form of a factored Markov decision process (fMDP) that can naturally model the evolution of power demand and uncertain outputs of non-dispatchable generators, see U.S. Ser. No. 12/870,703, "Method for Scheduling the Operation of Power Generators," filed by Nikovski et al., on Aug. 27, 2010. An approximately optimal policy for the resulting fMDP can be determined by a decision-space approximate dynamic programming (DSADP) method that achieves a better trade-off between the costs and operating risk than the deterministic approaches. However, that DSADP method uses AND/OR-trees that grow exponentially in the decision horizon, typically between 24 and 168 time steps, each of duration one hour, thereby rendering it impractical for most UC applications. In addition, that method uses a decommitment solver to select candidate configurations.

SUMMARY OF THE INVENTION

It is known that the unit commitment problems with uncertainties in power demands and the outputs of some generators can be represented as factored Markov decision process models.

This invention provides a state space approximate dynamic programming method, in conjunction with quadratic programming, to solve such models. Previously, we used a decommitment solver to select candidate configuration, see U.S. Ser. No. 12/870,703.

The embodiments of the invention provide a method for determining a reduced subset of optimal configurations of power generators to solve a unit commitment (UC) problems. The method approximates a mixed-integer programming (MIP) problem for determining the optimal schedules of the generators to be used for a given target value of power demand, by means of a related quadratic programming (QP) problem.

The method uses a procedure for traversing a range of likely power demands to determine a relatively small, but redundant set of generator schedules that can be used for subsequent solution of the UC problems by means of dynamic programming.

The embodiments of the invention provide a method to carry out dynamic programming on the reduced subset of optimal configurations, a set that is exponentially smaller than the set of all possible configurations. The method uses a functional metric to quantify the similarity among the configurations. In dynamic programming, if the value of a configuration is not calculated but is needed for updating its preceding configurations, the value of its most similar configuration in the reduced subset is used.

DETAILED DESCRIPTION OF THE PREFERRED EMBODIMENT

Figure 1:
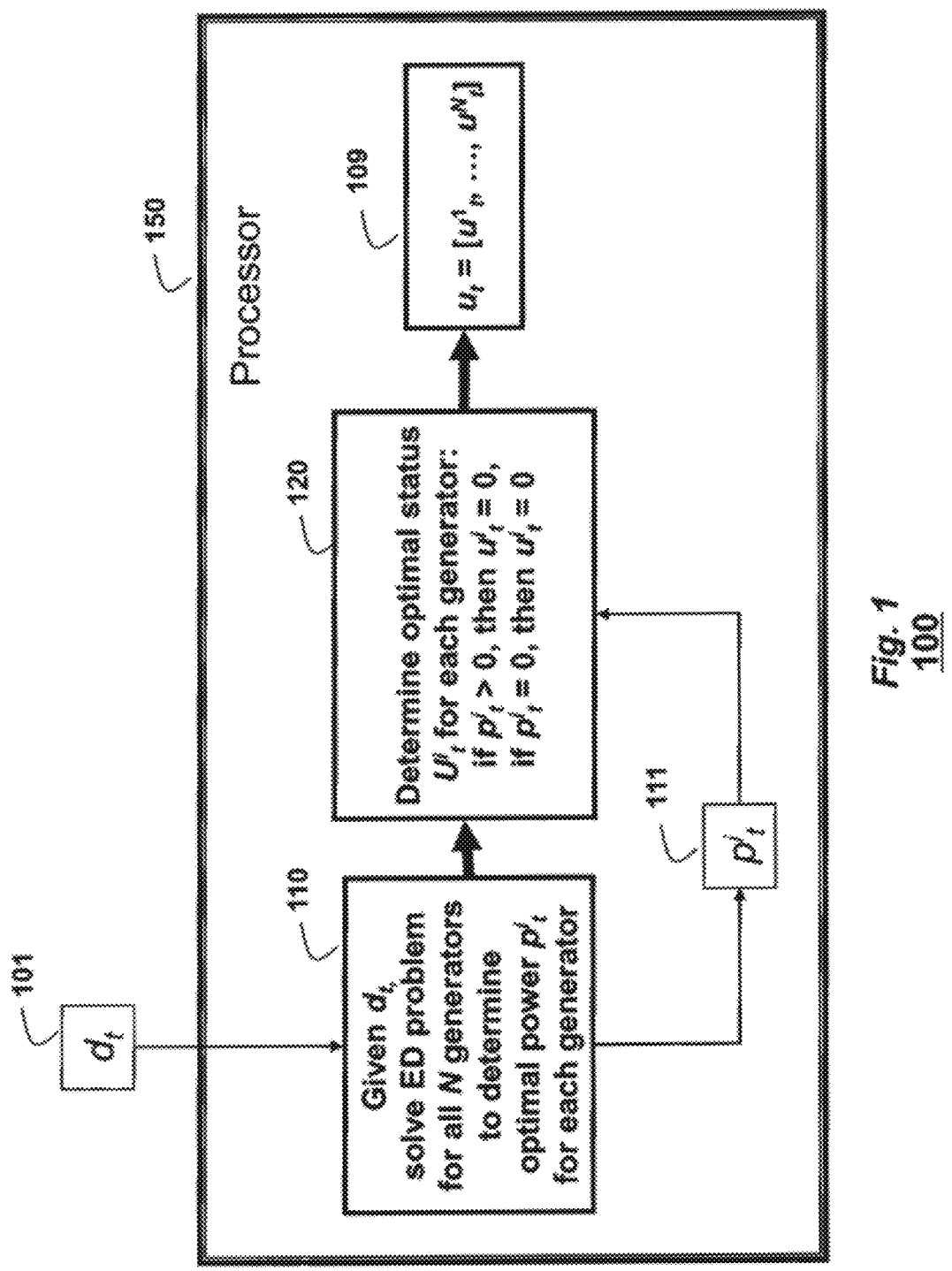
FIG. 1 is a flow chart of a method for determining an optimal configuration for a set of power generators to meet a target power demand according to embodiments of the invention.

A total of $2^{N \cdot T}$ schedules exist for sequences of configurations $u=[u_1, \ldots, u_T]$ of N generators over T time steps, where each schedule $u_t=[u^1_t, \ldots, u^N_t]$ is composed of Boolean commitment status variables $u^i_t \in \{0, 1\}$ of the individual generators (units), such that the status $u^i_t$ is 0 when the generator i is OFF at time t, and the status $u^i_t$ is 1 when the generator is ON.

When the generator is OFF, the operating cost is zero, and when the generator is ON, the operating cost can typically be represented by means of a quadratic function $$F_i(p^i_t) = c^i_0 + c^i_1 p^i_t + c^i_2 (p^i_t)^2,$$

where $p^i_t$ is the amount of power produced by the generator during this time step, and $c^i$ are non-negative constants.

An objective of a unit commitment solution method is to determine the optimal configuration u that minimizes an objective function $$J^*(u) = \min_{u=[u_1, u_2, \ldots, u_T]} E_{u_0, d_0} \left\{ \sum_{t=0}^{T-1} \left[ f(u_t, d_t) + \sum_{i=1}^{N} h_i(u^i_t, u^i_{t+1}) \right] \right\},$$

given an initial configuration $u_0$ and an initial demand $d_0$ for the generator. A sequence $d=[d_1, \ldots, d_T]$ is a realization of the expected values for the target power demand for each time step t. In the objective, $f(u_t, d_t)$ represents a total operating cost at time t for the set of generators, while $h_i(u^i_t, u^i_t+1)$ represents a cost of switching from configuration $u^i_t$ at Step t to $u^i_{t+1}$ at Step t+1. The operating cost $f(u_t, d_t)$ is a solution of a nested constrained optimization problem, or an economic dispatch (ED) problem $$f(u_t, d_t) = \min_{p^1_t, p^2_t, \ldots, p^N_t} \sum_{i=1}^{N} F_i(p^i_t),$$

subject to the constraint that production meets the target power demand $$\Sigma_{i=1}^{N} u^i_t p^i_t = d_t, p^i_t \geq 0 \text{ if } u^i_t = 1,$$

and the stipulation that generators that are OFF do not produce any power.

Determining the optimal solution for u by exhaustive enumeration of all possible configurations is not feasible, because there are $2^{N \cdot T}$ configurations. For example, for a relatively small problem with N=10 generators and T=24 one-hour time steps, the number of configurations is $2^{240}$. Instead, more advanced combinatorial optimization methods must be used.

One truncated dynamic programming method solves the unit commitment problem, Pang et al., "Optimal short-term thermal unit commitment, IEEE Trans. on Power Apparatus and Systems, vol. 95, no. 4, pages 1336-1346, July 1976. That method uses a unit selection list to avoid the computational difficulty of having to consider all $2^N$ possible subsets $u_t$ for any time step t. The unit selection list represents an ordering of the N generators by priority of loading. Generators with higher priority have lower production costs, and are loaded first. This way only N+1 primary configurations from all $2^N$ possible subsets are used for dynamic programming. When a generator is not available, for example, because it has reached its limit for maximum up time or has not reached its requirement for minimum down time, the next generator on the list is used instead.

Because the cost of producing a power is not constant, several methods for estimating the cost to be used for the unit selection list are possible, such as the average incremental production cost of a generator. For the quadratic function F, the incremental cost is $c^i_1 + c^i_2 p^i_t$ for a given power $p^i_t$, and the average incremental cost is $c^i_1 + c^i_2 M_i / 2$ over a production range, when $M_i$ is a maximal power capacity of generator i.

Other definitions of average cost are possible. For example, the fixed initial cost $c^i_0$ can be amortized over the average amount produced: $c^i_1 + c^i_2 M_i / 2 + 2 c^i_0 / M_i$. While that approach based on a priority list deals effectively with $2^N$ possible schedules, it has several shortcomings that lead to sub-optimality of the resulting configurations.

The first shortcoming is the strongly reduced size of the state space: whereas $2^N$ schedules are too many to handle computationally, only N+1 are usually too few for determining an efficient configuration. As described above, additional schedules are considered only when one of the generators on the priority list is not available due to operating constraints.

The second source of suboptimality is the variable incremental cost of production $c_{i1} + c^i_2 p^i_t$ for a single generator i, and the need to also amortize its fixed cost $c^i_0$ over the produced amount.

We solve the unit commitment problem by using multiple solutions to a related problem that we call the optimal configuration (OC) problem. The objective of the OC problem is to determine the configuration $u_t$ of the generators that minimizes the one-step operation cost $$f(u_t, d_t) = \min_{u^1_t, u^2_t, \ldots, u^N_t} \min_{p^1_t, p^2_t, \ldots, p^N_t} \sum_{i=1}^{N} F_i(p^i_t)$$

subject to the constraint that production meets demand:

$$\Sigma_{i=1}^{N} u^i_t p^i_t = d_t \text{ and } p^i_t \geq 0.$$

This problem is different from the UC problem and the ED problem. The UC problem considers temporal constraints, optimizes a cumulative cost J(u) over the entire planning horizon, and includes configuration switching costs $h_i(u^i_t, u^i_{t+1})$.

The ED problem assumes that the generator configuration is fixed and known, and only determines the production amounts $p^i_t$ for the generators that are ON.

The OC problem only optimizes over a single step, ignores temporal constraints, and does not include switching costs of the configurations. The OC problem optimizes over all possible configurations u to determine the optimal configuration. Thus, the OC problem is easier to solve than the full UC problem, but is much harder than the ED problem.

In our method, we use multiple solutions of the OC problem as a reduced state space for a dynamic programming algorithm, in order to solve the harder UC problem, as described below.

One computational efficiency of this approach is determining an efficient way of quickly solving multiple OC problems.

Solving OC Problems

To solve the simpler ED problem, any quadratic program (QP) can be used. In particular, for the convex cost functions $F_i(p^t_i)$ described above, an ellipsoid method is guaranteed to solve the problem in polynomial time.

In contrast, solving the general OC problem involves solving a mixed integer quadratic problem (MIQP), which typically resorts to combinatorial optimization over all $2^N$ possible configurations of the generators $u_t$. Although some methods for pruning the search space exist, such as the branch-and-bound, applying them multiple times to various instances of the OC problem is prohibitively time consuming.

We use a heuristic to solve the OC problem by reducing it to the related ED problem, and then solve the ED problem by means of a regular QP.

We realize that when a generator is relatively too costly to be used with other generators to meet a specific value of the target demand, the ED solver determines that the power to be produced by such a generator is the lowest possible allowed.

In particular, when the minimal allowed production amount is zero, which is typical for most generators, the ED solver determines that this generator should not produce any power.

Our method for solving the OC problem has the following steps, as shown in FIG. 1.

Given a target demand 101 at time t, solve 110 the ED problem for all N generators to determine an optimal amounts of $p^i_t$ 111 of power to be produced by each generator i, for $1 \leq i \leq N$.

For each $1 \leq i \leq N$, determine 120 an optimal status $u^i_t$ for each generator as follows.

If $p^i_t > 0$, then $u^i_t = 1$, otherwise, if $p^i_t = 0$, then $u^i_t = 0$.

The vector $u_t = [u^1_t, \ldots, u^N_t]$ 109 is then a solution of the OC problem to determine an optimal configuration of generators to meet the target demand $d_t$. This method of solving the OC problem is computationally similar to the solution of the related ED problem by means of QP.

The steps of the above method can be performed in a processor 150 connected to a memory and input/output interfaces as known in the art.

Using OC Solutions for Unit Commitment

Identifying the single most suitable schedule $u_t = [u^1_t, \ldots, u^N_t]$ to meet the target demand $d_t$ at time t. Composing the sequence $u = [u_1, \ldots, u_T]$ of such a configuration for each step, does not necessarily constitute a valid solution to the overall UC problem of meeting the target demand. The reason is that the sequence of such solutions might not satisfy the operational constraints, for example, if a low-cost generator is ON in every schedule $u_t$, $1 \leq t \leq T$, but has a maximum ON time shorter than T time steps, then the sequence u violates the constraints for that generator, and is not a valid solution.

To overcome this problem, we determine a redundant set of suitable schedules $u_{t,m}$, m=1, M for each time step t, and use these with the dynamic programming method described by Pang et al. "Optimal short-term thermal unit commitment, IEEE Trans. on Power Apparatus and Systems, vol. 95, no. 4, pages 1336-1346, July 1976. Here M is a suitably large number, dependent on the computational resources available. To have redundancy, we solve the OC problem with subsets of N−1 generators, by removing the generators one by one from the entire set. Because there are N such subsets of N−1 generators, this results in N new suitable schedules for the dynamic programming method to consider.

This idea can be extended further by removing all possible pairs, triplets, etc., generally n-tuples, of generators. The effect is that the dynamic programming solver has multiple options to consider if one or more generators are not available for generation due to operational constraints.

State-Space Approximate Dynamic Programming (SSADP)

The embodiments of the invention provide methods for solving stochastic unit commitment problems described in the form of fMDPs. To handle the large state space of the problem, an approximate dynamic programming (SSADP) method uses a reduced set of representative system configurations (states) that was described above using the OC solutions, and uses a state aggregation approach with a suitable metric to represent the value function of states outside of this set.

The size of the set of the configurations with which SSADP works is polynomial in the number of generators and the decision horizon, thus eliminating the limitation of the conventional DSADP method. Therefore, the SSADP method can solve much larger problems than the DSADP method.

In the SSADP method, if the value of a configuration is not calculated but is needed for updating its preceding configurations, the value of its most similar configuration in the reduced subset is used. To put this into practice, the SSADP method uses a functional metric to quantify the similarity among the configurations.

Figure 2:
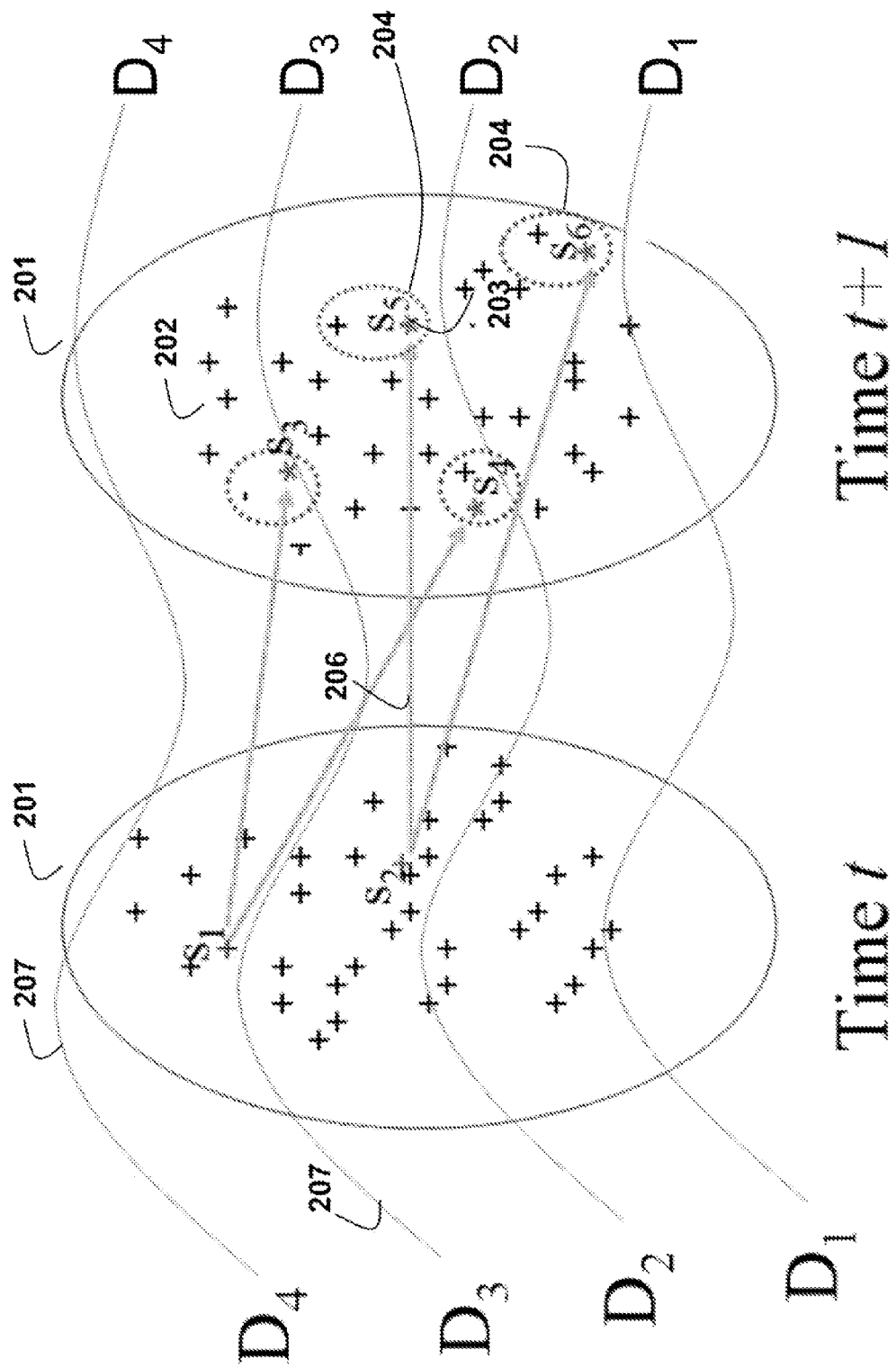
FIG. 2 is a schematic of a SSADP method according to embodiments of the invention.

FIG. 2 shows how the SSADP method works for time steps t and t+1. The two large solid eclipses 201 represent the full state space. The target demands $D_1$-$D_4$ are selected to generate the system configurations using OC solutions, denoted by plus signs 202. As shown the demands 207 can fluctuate up and down over time.

The set of the plus signs is the generated state space for the SSADP. For example when performing value updates 206 for state $s_2$, the two successor states $s_5$ and $s_6$, represented as stars 203, are not determined at step t+1. The SSADP uses the similarity metric to search the most similar states represented by pluses at step t+1 and enclosed in the small dashed eclipses 204 of states $s_5$ and $s_6$. The values of the most similar states are used for the un-calculated states $s_5$ and $s_6$. The value updates for the state $s_1$ into the state $s_3$ and $s_4$ are performed in a similar manner.

The functional metric measures the similarity of any two configurations. From a cost perspective, if the difference between a cost-to-go of one configuration and that of the other configuration is smaller, the configurations are more similar. In the SSADP method, the overall similarity of a pair of configurations $s_1$ and $s_2$ is the sum of the following three component differences: the difference of a committed capacity of the pair of configurations where the committed capacity of a state is the sum of the maximum capacities of the ON-generators in the configuration, a transitional capacity of the pair of configurations, that is the sum of the capacities for those generators that are ON in one state but are OFF in the other state, and a demand difference in which demands are associated with the configurations in solving the OC problems.

Such a metric can measure the similarity of any two configurations. The metric is non-negative, identical of indiscernibles, and symmetrical. In practice, the metric can be used for state aggregate dynamic programming. Because the SSADP method works with an exponentially smaller subset of all possible configurations and does not perform value updates for all configurations, it is possible that the value of the successor states of a configuration is not computed. In that case, the metric can be used to identify its most similar configuration. SSADP uses the value of the most similar state instead. As such, the metric makes it possible for SSADP to perform value updates over the reduced set of the configurations resulted from solving the optimal configuration (OC) problems.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for solving a unit commitment problem for a set of generators with a set of configurations having a set of $2^{N*T}$ schedules, wherein N is a number of generators i and T is a number of decision time steps, wherein for each decision time step there is $2^N$ configurations in the set of configurations, comprising the steps of:
   determining, from the set of configurations, a reduced set of configurations of the set of generators, wherein the determining includes selecting, for each decision time step, a subset of configurations of N generators, such that each configuration in the subset meets a power demand for the decision time step, wherein the selecting includes determining which configurations in the reduced set of configurations have minimal cost of meeting the power demand allowing for contingencies for when one or more generators of the set of generators are not available for the decision time step; and
   defining a functional metric to measure a similarity of all possible pairs of the reduced set of configurations;
   applying dynamic programming to the reduced set of configurations using the functional metric to determine an optimal configuration in the reduced set of configurations, wherein the dynamic programming uses approximation and the functional metric to measure a difference of a cost-to-go of a configuration that is not in the subset of configurations of N generators for successive decision time steps, wherein the method is performed in a processor.

2. The method of claim 1, wherein the set of configurations is $u=[U_1, \ldots, u_T]$, and a target power demand at the time step t is $d_t$, further comprising:
   solving an economic dispatch problem for he set of generators to determine an optimal power $p^i_t$ for each generator i at the time step t; and
   determining an optimal OFF (0) or ON (1) status $u^i_t$ for each generator i, wherein
   if $p^i_t > 0$, then $u^i_t = 1$, otherwise, if $p^i_t = 0$, then $u^i_t = 0$, such that $u_t = [u^1_t, \ldots, u^N_t]$ is the optimal configuration.

3. The method of claim 2, wherein an operating cost for the generator i is represented by a quadratic function
$$F_i(p^i_t = c^i_0 + c^i_1 p^i_t + c^i_2 (p^i_t)^2,$$
where $c^i$ are non-negative constants.

4. The method of claim 3, wherein an incremental cost of the quadratic function $F_i(p^i_t)$ is $c^i_1 + c^i_2 p^i_t$ for the power $p^i_t$, and an average of the incremental cost is $c^i_1 + c_{i2} M_i = 2$ over a production range, when $M_i$ is a maximal power capacity of generator i.

5. The method of claim 3, further comprising:
   solving the quadratic function using a mixed integer quadratic problem.

6. The method of claim 2, further comprising:
   determining a redundant set of suitable schedules $u_{t,m}$, m=1, M for each time step t by removing the generators one by n-tuples from the set of generators until the target power demand is met, while applying the dynamic programming.

7. The method of claim 1, wherein the functional metric measures a difference of a cost-to-go from a current configuration at time step t to a next configuration at time step t+1.

8. The method of claim 1, wherein the dynamic programming is approximate.

9. The method of claim 1, wherein the functional metric is used for state aggregate dynamic programming.

10. The method of claim 1, wherein determining further comprises:
    aggregating the power of each generator into a demand variable by subtracting outputs from total demand to yield a net demand;
    and
    selecting a collection of target demands by varying target reserves.

11. The method of claim 1, wherein the similarity of the pair of configurations is a sum of differences of committed capacity of the pair of configurations, a transitional capacity of the pair of configurations, and a demand difference of the pair of configurations.

* * * * *